US012731146B2

(12) United States Patent
Zhao et al.

(10) Patent No.: US 12,731,146 B2
(45) Date of Patent: Sep. 8, 2026

(54) SYSTEM, METHOD, AND COMPUTER PROGRAM PRODUCT FOR DETERMINING A REASON FOR A DEEP LEARNING MODEL OUTPUT

(71) Applicant: Visa International Service Association, San Francisco, CA (US)

(72) Inventors: Hangqi Zhao, Seattle, WA (US); Sheng Wang, Austin, TX (US); Dan Wang, Austin, TX (US); Yiwei Cai, Mercer Island, WA (US); Claudia Carolina Barcenas Cardenas, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 1218 days.

(21) Appl. No.: 17/691,402

(22) Filed: Mar. 10, 2022

(65) Prior Publication Data

US 2022/0284435 A1 Sep. 8, 2022

Related U.S. Application Data

(63) Continuation of application No. 16/515,255, filed on Jul. 18, 2019, now abandoned.

(51) Int. Cl.
*G06Q 20/40* (2012.01)
*G06F 17/16* (2006.01)
(Continued)

(52) U.S. Cl.
CPC ......... *G06Q 20/4016* (2013.01); *G06F 17/16* (2013.01); *G06F 17/18* (2013.01); *G06N 3/045* (2023.01); *G06N 3/08* (2013.01)

(58) Field of Classification Search
CPC .... G06Q 20/4016; G06N 3/045; G06F 17/16; G06F 17/18
See application file for complete search history.

(56) References Cited

U.S. PATENT DOCUMENTS

| | | | | |
|---|---|---|---|---|
| 5,819,226 A * | 10/1998 | Gopinathan | G06Q 20/40 | 705/44 |
| 6,434,435 B1 | 8/2002 | Tubel et al. | | |

(Continued)

FOREIGN PATENT DOCUMENTS

| | | | |
|---|---|---|---|
| CN | 106651373 A * | 5/2017 | G06F 18/23 |
| WO | WO-2019134569 A1 * | 7/2019 | G06Q 10/10 |

OTHER PUBLICATIONS

Philipp Blandfort, etc., "An Overview of Computational Approaches for Interpretation Analysis", published on May 22, 2019 to arXiv, retrieved Sep. 6, 2025. (Year: 2019).*

(Continued)

*Primary Examiner* — Shourjo Dasgupta
(74) *Attorney, Agent, or Firm* — The Webb Law Firm

(57) ABSTRACT

A system, method, and product for determining a reason for a deep learning model output that obtain training data associated with training samples and first labels for the training samples; train a first model using the training samples and the first labels, training the first model generating predictions for the training samples; train a second model using the training samples and the predictions as second labels for the training samples; extract one or more weights of the trained second model; process, using the first model, input data including features associated with at least one sample, to generate output data, the output data including at least one prediction for the at least one sample; and apply the one or more extracted weights to the features to determine one or more contributions of one or more features of the features to the at least one prediction for the at least one sample.

18 Claims, 7 Drawing Sheets

(51) Int. Cl.

| | |
|---|---|
| ***G06F 17/18*** | (2006.01) |
| ***G06N 3/045*** | (2023.01) |
| ***G06N 3/08*** | (2023.01) |

(56) References Cited

U.S. PATENT DOCUMENTS

| | | | | |
|---|---|---|---|---|
| 7,089,592 | B2 * | 8/2006 | Adjaoute | G06Q 20/04 726/1 |
| 7,668,769 | B2 * | 2/2010 | Baker | G06Q 20/10 705/42 |
| 8,880,441 | B1 | 11/2014 | Chen et al. | |
| 9,454,733 | B1 | 9/2016 | Purpura et al. | |
| 9,990,639 | B1 | 6/2018 | Kong et al. | |
| 10,068,235 | B1 | 9/2018 | Boates et al. | |
| 10,110,738 | B1 | 10/2018 | Sawant et al. | |
| 11,023,894 | B2 * | 6/2021 | Adjaoute | G06Q 20/4016 |
| 2014/0180974 | A1 * | 6/2014 | Kennel | G06Q 30/0609 706/12 |
| 2014/0324677 | A1 | 10/2014 | Walraven et al. | |
| 2018/0033009 | A1 | 2/2018 | Goldman et al. | |
| 2018/0247161 | A1 | 8/2018 | Cowan | |
| 2019/0163666 | A1 | 5/2019 | Cakmak et al. | |
| 2019/0197549 | A1 | 6/2019 | Sharma | |
| 2019/0197550 | A1 | 6/2019 | Sharma | |
| 2019/0258927 | A1 | 8/2019 | Chen et al. | |
| 2019/0378210 | A1 * | 12/2019 | Merrill | G06N 5/01 |
| 2020/0045066 | A1 | 2/2020 | Meng et al. | |
| 2020/0302318 | A1 * | 9/2020 | Hetherington | G06N 20/20 |
| 2021/0142169 | A1 * | 5/2021 | De | G06N 3/08 |

OTHER PUBLICATIONS

Himabindu Lakkaraju, etc., "Interpretable & Explorable Approximations of Block Box Models", published on Jul. 4, 2017 to arXiv, retrieved Sep. 6, 2025. (Year: 2017).*

Zachary C. Lipton, etc., "The Mythos of Model Interpretability", published to ACMQUEUE, vol. 16, issue 3, pp. 2-17 and then online on Jul. 16, 2018, retrieved Sep. 6, 2025. (Year: 2018).*

W. James Murdoch, etc., "Interpretable machine learning: definitions, methods, and applications", published on Jan. 14, 2019 to arXiv, retrieved Sep. 6, 2025. (Year: 2019).*

Zhengping Che, etc., "Interpretable Deep Models for ICU Outcome Prediction", published via AMIA Annu Symp Proc. on Feb. 10, 2017, retrieved Sep. 6, 2025. (Year: 2017).*

Xian Liu, etc., "Improving the Interpretability of Deep Neural Networks with Knowledge Distillation", published via 2018 IEEE International Conference on Data Mining Workshops (ICDMW), retrieved Mar. 30, 2026. (Year: 2018).*

Anoop Korattikara, etc., "Bayesian Dark Knowledge", published on Nov. 6, 2015 to arXiv, retrieved Mar. 30, 2026. (Year: 2015).*

Animesh Koratana, etc., "LIT: Learned Intermediate Representation Training for Model Compression", published via Proceedings of the 36th International Conference on Machine Learning, Long Beach, CA, USA, 2019, retrieved Mar. 30, 2026. (Year: 2019).*

Cristian Bucila, etc., "Model Compression", published via KDD '06, Aug. 30-Aug. 23/2006, Philadelphia, PA, USA, retrieved Mar. 30, 2026. (Year: 2006).*

Lei Jimmy Ba, etc., "Do Deep Nets Really Need to be Deep?", published via Advances in Neural Information Processing Systems 27 (NIPS 2014), retrieved Mar. 30, 2026. (Year: 2014).*

Geoffrey Hinton, etc., "Distilling the Knowledge in a Neural Network", published on Mar. 9, 2015 to arXiv, retrieved Mar. 30, 2026. (Year: 2015).*

Shenvi et al., "Credit Card Fraud Detection using Deep Learning", 2019 5th International Conference for Convergence in Technology (I2CT), 2019, pp. 1-5.

Srivastava et al., "Credit Card Fraud Detection at Merchant Side using Neural Networks", IEEE, 2016 International Conference on Computing for Sustainable Global Development, 2016, pp. 667-670.

* cited by examiner

SYSTEM, METHOD, AND COMPUTER PROGRAM PRODUCT FOR DETERMINING A REASON FOR A DEEP LEARNING MODEL OUTPUT

CROSS-REFERENCE TO RELATED APPLICATION

This application is a continuation of U.S. patent application Ser. No. 16/515,255 filed on Jul. 18, 2019, the disclosure of which is hereby incorporated by reference in its entirety.

BACKGROUND

1. Field

This disclosure relates generally to model interpretability and, in some embodiments or aspects, to a system, a method, and a computer program product for determining a reason for a deep learning model output.

2. Technical Considerations

Deep learning models may include millions of parameters and be trained using billions of examples, which can offer larger capacity and better generalization performance that is difficult for simpler models to match. However, deep learning models may also have decreased interpretability as compared to simpler models. For example, deep learning models may be compared to black boxes, which can often give accurate results, but which also lack interpretability. As an example, explaining the results of a deep learning model, such as by identifying reason codes for decisions made by the deep learning model, is typically very challenging.

Accordingly, with the involvement of more complex deep learning models in decision making, it is more difficult for users to perceive the underlying reasoning process that leads to decisions by the more complex deep learning models. However, in many scenarios, it is helpful and/or necessary to provide reasons (e.g., which features contribute more to a prediction for a particular sample, reason codes associated therewith, etc.) for deep learning applications. For example, model interpretation is likely to remain a vital concern in the payment industry for years to come, because if users do not trust a model or the decisions thereof, the users will not implement the model or the decisions thereof. As an example, issuers may want to know a reason why a fraud risk of a transaction is predicted to decline the transaction. To make the task of model interpretation more challenging, reasons for model outputs or predictions may be requested and/or required in real-time for making decisions in a timelier manner, such as in fraud prediction applications, and/or the like.

Accordingly, there is a need in the art to improve determination of a reason for a deep learning model output.

SUMMARY

Accordingly, provided are systems, methods, and computer program products for improving determination of a reason for a deep learning model output.

According to some non-limiting embodiments or aspects, provided is a computer-implemented method including: obtaining, with at least one processor, training data associated with a plurality of training samples and a plurality of first labels for the plurality of training samples; training, with at least one processor, a first model using the plurality of training samples and the plurality of first labels for the plurality of training samples, training the first model generating a plurality of predictions for the plurality of training samples; training, with at least one processor, a second model using the plurality of training samples and the plurality of predictions as a plurality of second labels for the plurality of training samples; extracting, with at least one processor, one or more weights of the trained second model; processing, with at least one processor using the first model, input data including a plurality of features associated with at least one sample, to generate output data, the output data including at least one prediction for the at least one sample; and applying, with at least one processor, the one or more extracted weights to the plurality of features to determine one or more contributions of one or more features of the plurality of features to the at least one prediction for the at least one sample.

In some non-limiting embodiments or aspects, the input data includes transaction data, the at least one sample is associated with at least one transaction, and the at least one prediction includes at least one probability of whether the at least one transaction is a fraudulent transaction.

In some non-limiting embodiments or aspects, the one or more contributions are determined in real-time during processing of the at least one transaction in a transaction processing network.

In some non-limiting embodiments or aspects, the first model includes a greater number of hidden layers than the second model.

In some non-limiting embodiments or aspects, the method further includes: ranking, with at least one processor, the plurality of features associated with the at least one sample according to the one or more contributions of the one or more features of the plurality of features to the at least one prediction for the at least one sample; and identifying, with at least one processor, at least one feature of the plurality of features with respect to at least one other feature of the plurality of features based on the ranked plurality of features as at least one reason code associated with the at least one prediction.

In some non-limiting embodiments or aspects, the one or more extracted weights include a plurality of extracted weights, the plurality of extracted weights is associated with a plurality of hidden units of at least one hidden layer of the trained second model, and the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

In some non-limiting embodiments or aspects, the method further includes: determining, by at least one processor, a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \tag{1}$$

-continued $$a_j = \max(0, h_j) \tag{2}$$

$$y_m = \sum_{j=1}^{H} a_j * v_{jm} \tag{3}$$

$$\text{Contribution}(x_i -> y_m) = \sum_{j=1}^{H} (x_i * u_{ij}) * (a_j * v_{jm}) \tag{4}$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

According to some non-limiting embodiments or aspects, provided is a computing system including: one or more processors programmed and/or configured to: obtain training data associated with a plurality of training samples and a plurality of first labels for the plurality of training samples; train a first model using the plurality of training samples and the plurality of first labels for the plurality of training samples, training the first model generating a plurality of predictions for the plurality of training samples; train a second model using the plurality of training samples and the plurality of predictions as a plurality of second labels for the plurality of training samples; extract one or more weights of the trained second model; process, using the first model, input data including a plurality of features associated with at least one sample, to generate output data, the output data including at least one prediction for the at least one sample; and apply the one or more extracted weights to the plurality of features to determine one or more contributions of one or more features of the plurality of features to the at least one prediction for the at least one sample.

In some non-limiting embodiments or aspects, the input data includes transaction data, the at least one sample is associated with at least one transaction, and the at least one prediction includes at least one probability of whether the at least one transaction is a fraudulent transaction.

In some non-limiting embodiments or aspects, the one or more contributions are determined in real-time during processing of the at least one transaction in a transaction processing network.

In some non-limiting embodiments or aspects, the first model includes a greater number of hidden layers than the second model.

In some non-limiting embodiments or aspects, the one or more processors are further programmed and/or configured to: rank the plurality of features associated with the at least one sample according to the one or more contributions of the one or more features of the plurality of features to the at least one prediction for the at least one sample; and identify at least one feature of the plurality of features with respect to at least one other feature of the plurality of features based on the ranked plurality of features as at least one reason code associated with the at least one prediction.

In some non-limiting embodiments or aspects, the one or more extracted weights include a plurality of extracted weights, the plurality of extracted weights is associated with a plurality of hidden units of at least one hidden layer of the trained second model, and the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

In some non-limiting embodiments or aspects, the one or more processors are further programmed and/or configured to: determine a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \tag{1}$$

$$a_j = \max(0, h_j) \tag{2}$$

$$y_m = \sum_{j=1}^{H} a_j * v_{jm} \tag{3}$$

$$\text{Contribution}(x_i -> y_m) = \sum_{j=1}^{H} (x_i * u_{ij}) * (a_j * v_{jm}) \tag{4}$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

According to some non-limiting embodiments or aspects, provided is a computer program product including at least one non-transitory computer-readable medium including program instructions that, when executed by at least one processor, cause the at least one processor to: obtain training data associated with a plurality of training samples and a plurality of first labels for the plurality of training samples; train a first model using the plurality of training samples and the plurality of first labels for the plurality of training samples, training the first model generating a plurality of predictions for the plurality of training samples; train a second model using the plurality of training samples and the plurality of predictions as a plurality of second labels for the plurality of training samples; extract one or more weights of the trained second model; process, using the first model, input data including a plurality of features associated with at least one sample, to generate output data, the output data including at least one prediction for the at least one sample; and apply the one or more extracted weights to the plurality of features to determine one or more contributions of one or more features of the plurality of features to the at least one prediction for the at least one sample.

In some non-limiting embodiments or aspects, the input data includes transaction data, the at least one sample is associated with at least one transaction, the at least one prediction includes at least one probability of whether the at least one transaction is a fraudulent transaction, and the one or more contributions are determined in real-time during processing of the at least one transaction in a transaction processing network.

In some non-limiting embodiments or aspects, the first model includes a greater number of hidden layers than the second model.

In some non-limiting embodiments or aspects, the one or more processors are further programmed and/or configured to: rank the plurality of features associated with the at least one sample according to the one or more contributions of the one or more features of the plurality of features to the at least one prediction for the at least one sample; and identify at least one feature of the plurality of features with respect to at least one other feature of the plurality of features based on the ranked plurality of features as at least one reason code associated with the at least one prediction.

In some non-limiting embodiments or aspects, the one or more extracted weights include a plurality of extracted weights, the plurality of extracted weights is associated with a plurality of hidden units of at least one hidden layer of the trained second model, and the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

In some non-limiting embodiments or aspects, the one or more processors are further programmed and/or configured to: determine a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \tag{1}$$

$$a_j = \max(0, h_j) \tag{2}$$

$$y_m = \sum_{j=1}^{H} a_j * v_{jm} \tag{3}$$

$$\text{Contribution}(x_i \to y_m) = \sum_{j=1}^{H} (x_i * u_{ij}) * (a_j * v_{jm}) \tag{4}$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

Further embodiments or aspects are set forth in the following numbered clauses:

Clause 1. A computer-implemented method comprising: obtaining, with at least one processor, training data associated with a plurality of training samples and a plurality of first labels for the plurality of training samples; training, with at least one processor, a first model using the plurality of training samples and the plurality of first labels for the plurality of training samples, wherein training the first model generates a plurality of predictions for the plurality of training samples; training, with at least one processor, a second model using the plurality of training samples and the plurality of predictions as a plurality of second labels for the plurality of training samples; extracting, with at least one processor, one or more weights of the trained second model; processing, with at least one processor using the first model, input data including a plurality of features associated with at least one sample, to generate output data, wherein the output data includes at least one prediction for the at least one sample; and applying, with at least one processor, the one or more extracted weights to the plurality of features to determine one or more contributions of one or more features of the plurality of features to the at least one prediction for the at least one sample.

Clause 2. The computer-implemented method of clause 1, wherein the input data includes transaction data, wherein the at least one sample is associated with at least one transaction, and wherein the at least one prediction includes at least one probability of whether the at least one transaction is a fraudulent transaction.

Clause 3. The computer-implemented method of any of clauses 1 and 2, wherein the one or more contributions are determined in real-time during processing of the at least one transaction in a transaction processing network.

Clause 4. The computer-implemented method of any of clauses 1-3, wherein the first model includes a greater number of hidden layers than the second model.

Clause 5. The computer-implemented method of any of clauses 1-4, further comprising: ranking, with at least one processor, the plurality of features associated with the at least one sample according to the one or more contributions of the one or more features of the plurality of features to the at least one prediction for the at least one sample; and identifying, with at least one processor, at least one feature of the plurality of features with respect to at least one other feature of the plurality of features based on the ranked plurality of features as at least one reason code associated with the at least one prediction.

Clause 6. The computer-implemented method of any of clauses 1-5, wherein the one or more extracted weights include a plurality of extracted weights, wherein the plurality of extracted weights is associated with a plurality of hidden units of at least one hidden layer of the trained second model, and wherein the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

Clause 7. The computer-implemented method of any of clauses 1-6, further comprising: determining, by at least one processor, a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \quad (1)$$

$$a_j = \max(0, h_j) \quad (2)$$

$$y_m = \sum_{j=1}^{H} a_j * v_{jm} \quad (3)$$

$$\text{Contribution}(x_i \text{ -> } y_m) = \sum_{j=1}^{H} (x_i * u_{ij}) * (a_j * v_{jm}) \quad (4)$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

Clause 8. A computing system comprising: one or more processors programmed and/or configured to: obtain training data associated with a plurality of training samples and a plurality of first labels for the plurality of training samples; train a first model using the plurality of training samples and the plurality of first labels for the plurality of training samples, wherein training the first model generates a plurality of predictions for the plurality of training samples; train a second model using the plurality of training samples and the plurality of predictions as a plurality of second labels for the plurality of training samples; extract one or more weights of the trained second model; process, using the first model, input data including a plurality of features associated with at least one sample, to generate output data, wherein the output data includes at least one prediction for the at least one sample; and apply the one or more extracted weights to the plurality of features to determine one or more contributions of one or more features of the plurality of features to the at least one prediction for the at least one sample.

Clause 9. The computing system of clause 8, wherein the input data includes transaction data, wherein the at least one sample is associated with at least one transaction, and wherein the at least one prediction includes at least one probability of whether the at least one transaction is a fraudulent transaction.

Clause 10. The computing system of any of clauses 8 and 9, wherein the one or more contributions are determined in real-time during processing of the at least one transaction in a transaction processing network.

Clause 11. The computing system of any of clauses 8-10, wherein the first model includes a greater number of hidden layers than the second model.

Clause 12. The computing system of any of clauses 8-11, wherein the one or more processors are further programmed and/or configured to: rank the plurality of features associated with the at least one sample according to the one or more contributions of the one or more features of the plurality of features to the at least one prediction for the at least one sample; and identify at least one feature of the plurality of features with respect to at least one other feature of the plurality of features based on the ranked plurality of features as at least one reason code associated with the at least one prediction.

Clause 13. The computing system of any of clauses 8-12, wherein the one or more extracted weights include a plurality of extracted weights, wherein the plurality of extracted weights is associated with a plurality of hidden units of at least one hidden layer of the trained second model, and wherein the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

Clause 14. The computing system of any of clauses 8-13, wherein the one or more processors are further programmed and/or configured to: determine a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \quad (1)$$

$$a_j = \max(0, h_j) \quad (2)$$

$$y_m = \sum_{j=1}^{H} a_j * v_{jm} \quad (3)$$

$$\text{Contribution}(x_i \text{ -> } y_m) = \sum_{j=1}^{H} (x_i * u_{ij}) * (a_j * v_{jm}) \quad (4)$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

Clause 15. A computer program product comprising at least one non-transitory computer-readable medium including program instructions that, when executed by at least one processor, cause the at least one processor to: obtain training data associated with a plurality of training samples and a plurality of first labels for the plurality of training samples; train a first model using the plurality of training samples and the plurality of first labels for the plurality of training samples, wherein training the first model generates a plurality of predictions for the plurality of training samples; train a second model using the plurality of training samples and the plurality of predictions as a plurality of second labels for the plurality of training samples; extract one or more weights of the trained second model; process, using the first model, input data including a plurality of features associated with at least one sample, to generate output data, wherein the output data includes at least one prediction for the at least one sample; and apply the one or more extracted weights to the plurality of features to determine one or more contributions of one or more features of the plurality of features to the at least one prediction for the at least one sample.

Clause 16. The computer program product of clause 15, wherein the input data includes transaction data, wherein the at least one sample is associated with at least one transaction, wherein the at least one prediction includes at least one probability of whether the at least one transaction is a fraudulent transaction, and wherein the one or more contributions are determined in real-time during processing of the at least one transaction in a transaction processing network.

Clause 17. The computer program product of any of clauses 15 and 16, wherein the first model includes a greater number of hidden layers than the second model.

Clause 18. The computer program product of any of clauses 15-17, wherein the one or more processors are further programmed and/or configured to: rank the plurality of features associated with the at least one sample according to the one or more contributions of the one or more features of the plurality of features to the at least one prediction for the at least one sample; and identify at least one feature of the plurality of features with respect to at least one other feature of the plurality of features based on the ranked plurality of features as at least one reason code associated with the at least one prediction.

Clause 19. The computer program product of clauses 15-18, wherein the one or more extracted weights include a plurality of extracted weights, wherein the plurality of extracted weights is associated with a plurality of hidden units of at least one hidden layer of the trained second model, and wherein the one or more contributions of the one or more features of the plurality of features to the at least one prediction for the at least one sample is determined by: calculating a score for each path of a plurality of paths of the one or more features through the second model based on the plurality of extracted weights and at least one activation function; and summing each score for each path of the plurality of paths to determine a contribution score for the one or more contributions of the one or more features.

Clause 20. The computer program product of any of clauses 15-19 wherein the one or more processors are further programmed and/or configured to: determine a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \tag{1}$$

$$a_j = \max(0, h_j) \tag{2}$$

$$y_m = \sum_{j=1}^{H} a_j * v_{jm} \tag{3}$$

$$\text{Contribution}(x_i \to y_m) = \sum_{j=1}^{H} (x_i * u_{ij}) * (a_j * v_{jm}) \tag{4}$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, wherein $v_{jm}$ is a weight matrix applied to an output of the activation unit $a_j$ on a path to the prediction $y_m$.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which:

FIG. 3 is a flowchart illustrating non-limiting embodiments or aspects of a process for determining a reason for a deep learning model output;

DESCRIPTION

Figure 1:
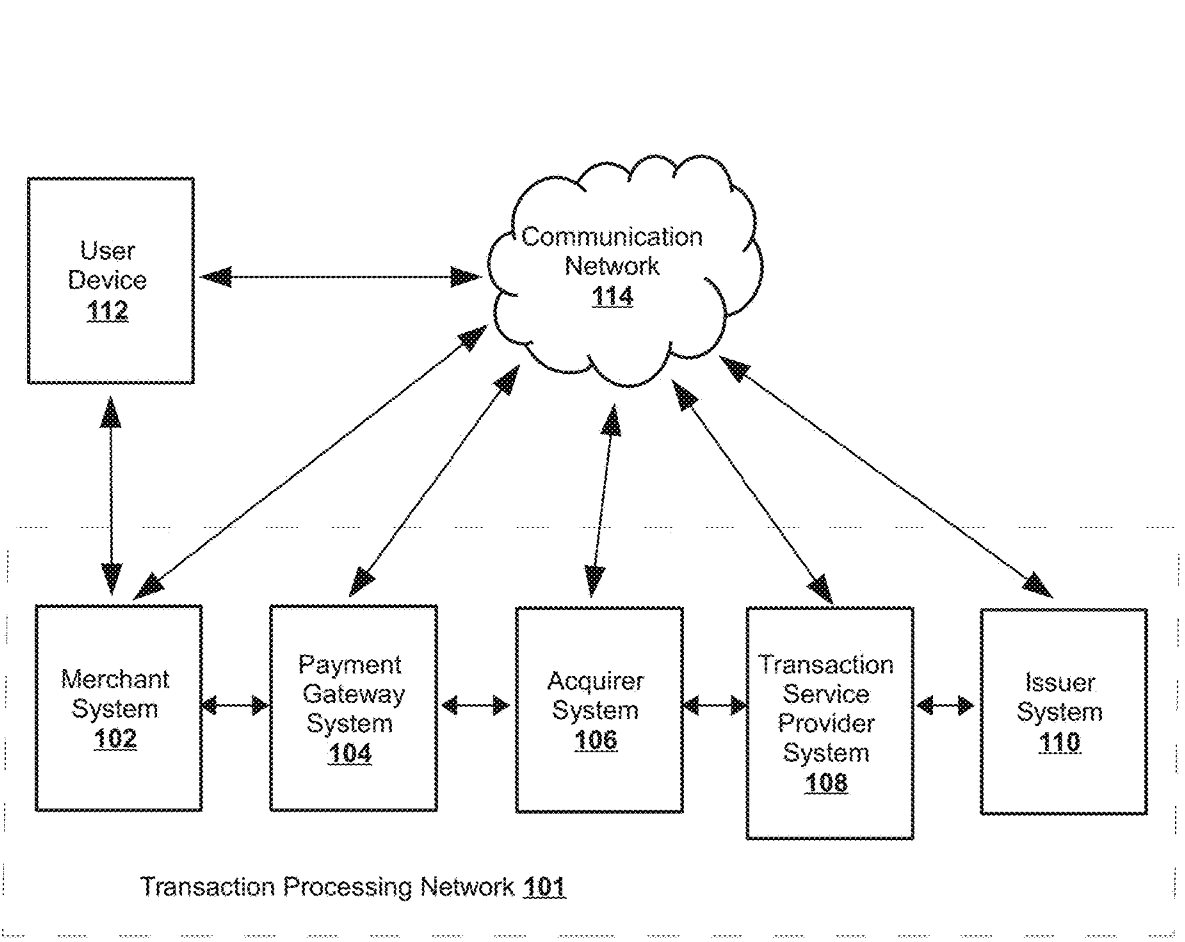
FIG. 1 is a diagram of non-limiting embodiments or aspects of an environment in which systems, devices, products, apparatus, and/or methods as described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

For purposes of the description hereinafter, the terms "end," "upper," "lower," "right," "left," "vertical," "horizontal," "top," "bottom," "lateral," "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects of the embodiments disclosed herein are not to be considered as limiting unless otherwise indicated.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer" or "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer" or "acquirer institution" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes. The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computing system" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a security card, a computer, an access card, a wireless terminal, and/or a transponder, and/or the like. In some non-limiting embodiments, the portable financial device may include a volatile or a non-volatile memory to store information, (e.g., an account identifier, a name of the account holder, and/or the like).

Provided are improved systems, methods, and computer program products for determining a reason for a deep learning model output.

Existing techniques for determining reasons for model outputs include model approximation techniques and sensitivity analysis techniques. An existing model approximation technique may obtain each of the training samples and labels given by a complex deep learning model and, to determine a reason for a model output of the deep learning model for each new sample, determine a subset of the training samples that are similar to the new sample, train a linear regression model using the corresponding subset of the training samples and the results of the deep learning model for that subset, the linear regression model being an approximation of the deep learning model for that subset, and directly use the weights of the corresponding linear regression model to rank each feature and determine the top-ranked features as reason codes for an output of the deep learning model corresponding to the new sample. Although this existing model approximation technique may provide relatively high interpretability due to the weights of the linear regression being and/or corresponding to the importance measurements, this existing technique may have (i) relatively mediocre accuracy (e.g., as compared to sensitivity analysis techniques, etc.), because linear regression is a relatively simple modeling approach that provides a local approximation, and (ii) relatively low efficiency due to the processing time and resources used to determine the similar samples and train a model for each similar sample, which may not be performed in real-time (e.g., during processing of a transaction in a transaction processing network, etc.).

An existing sensitivity analysis technique may obtain each of the training samples and labels given by a complex deep learning model and, to determine a reason for a model output of the deep learning model for each new sample, perturbate, for each feature of that new sample, a value of the feature by changing it to some other value (e.g., empty, null, mean, etc.), determine a prediction for the perturbated sample using the original complex deep learning model, and calculate a performance drop between a prediction for the original sample from the deep learning model and the prediction for the perturbated sample. The features in each sample may be ranked according to the corresponding performance drops of the features to determine the top-ranked features as reason codes for the prediction for the new sample. Although this existing sensitivity analysis technique may provide relatively high accuracy due to directly measuring an impact of features on performance of the model and a relatively high interpretability due to calculation of the performance drop being a transparent process, this existing technique may have relatively low efficiency due to the processing time and resources used to execute or run the deep learning model n number of feature times for each new sample, where the number n of the features in each sample can be relatively large (e.g., 100 features, 1000 features, etc.), which may not be performed in real-time (e.g., during processing of a transaction in a transaction processing network, etc.).

In this way, existing techniques for determining reasons for deep learning model outputs do not provide a mechanism for determining a reason for a deep learning model output in an efficient (e.g., real-time, etc.) manner while also providing an acceptable level of accuracy and interpretability.

Non-limiting embodiments or aspects of the present disclosure are directed to systems, methods, and computer program products that obtain training data associated with a plurality of training samples and a plurality of first labels for the plurality of training samples; train a first model using the plurality of training samples and the plurality of first labels for the plurality of training samples, wherein training the first model generates a plurality of predictions for the plurality of training samples; train a second model using the plurality of training samples and the plurality of predictions as a plurality of second labels for the plurality of training samples; extract one or more weights of the trained second model; process, using the first model, input data including a plurality of features associated with at least one sample, to generate output data, wherein the output data includes at least one prediction for the at least one sample; and apply the one or more extracted weights to the plurality of features to determine one or more contributions of one or more features of the plurality of features to the at least one prediction for the at least one sample. For example, non-limiting embodiments or aspects of the present disclosure may obtain each of the training samples and labels given by a complex deep learning model, train (e.g., train offline, etc.) a simpler neural network (e.g., a two layer neural network, etc.) using the training samples and the results from the complex deep learning model, the simpler neural network being global approximation of the deep learning model, extract and/or store the weights of the simpler neural network, and, to determine a reason for a model output of the deep learning model for each new sample, evaluate the new sample using the simpler model and identify the contribution score of each feature using simple calculations according to feature values and the model weights of the simpler model, and ranking features by their contribution score to determine certain (e.g., top-ranked, etc.) features as reason codes.

In this way, non-limiting embodiments or aspects of the present disclosure may provide a reason for a deep learning model output in a more efficient (e.g., real-time, etc.) manner while also providing an acceptable level of accuracy and interpretability. Accordingly, non-limiting embodiments or aspects of the present disclosure may provide a better balance between an accuracy, an interpretability, and an efficiency of a machine learning model by approximating an original complex deep learning model with a simpler but more interpretable neural network model with sufficient accuracy, and generating reason codes from the simpler model utilizing weights of the simpler model, which enables the provision of real time reason codes for deep learning based models and applications, such as those in the financial industry (e.g., fraud detection models, stand-in processing models, etc.). For example, non-limiting embodiments or aspects of the present disclosure may have (i) relatively high accuracy (e.g., due to a simpler neural network being more accurate than linear regression because a neural network considers non-linearity, etc.), (ii) relatively high interpretability (e.g., due to a simpler neural network being relatively easy to interpret, etc.), and (iii) relatively high efficiency (e.g., due to the simpler neural network being trained only once and/or offline, which enables relatively simple calculations to be executed in real-time to determine contributions of features in new samples, etc.)

Referring now to FIG. 1, FIG. 1 is a diagram of an example environment 100 in which devices, systems, methods, and/or products described herein, may be implemented. As shown in FIG. 1, environment 100 includes transaction processing network 101, which can include merchant system 102, payment gateway 104, acquirer system 106, transaction service provider system 108, and/or issuer system 110, user device 112, and/or communication network 114. Transaction processing network 101, merchant system 102, payment gateway 104, acquirer system 106, transaction service provider system 108, issuer system 110, and/or user device 112 may interconnect (e.g., establish a connection to communicate) via wired connections, wireless connections, or a combination of wired and wireless connections.

Merchant system 102 may include one or more devices capable of receiving information from payment gateway 104, acquirer system 106, transaction service provider system 108, issuer system 110, and/or user device 112 (e.g., via communication network 114, via transaction processing network 101, etc.) and/or communicating information to payment gateway 104, acquirer system 106, transaction service provider system 108, issuer system 110, and/or user device 112 (e.g., via communication network 114, via transaction processing network 101, etc.). Merchant system 102 may include a device capable of receiving information from user device 112 via a communication connection (e.g., an NFC communication connection, an RFID communication connection, a Bluetooth® communication connection, and/or the like) with user device 112, and/or communicating information to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information from merchant system 102, acquirer system 106, transaction service provider system 108, issuer system 110, and/or user device 112 (e.g., via communication network 114, via transaction processing network 101, etc.) and/or communicating information to merchant system 102, acquirer system 106, transaction service provider system 108, issuer system 110, and/or user device 112 (e.g., via communication network 114, via transaction processing network 101, etc.). For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information from merchant system 102, payment gateway 104, transaction service provider system 108, issuer system 110, and/or user device 112 (e.g., via communication network 114, via transaction processing network 101, etc.) and/or communicating information to merchant system 102, payment gateway 104, transaction service provider system 108, issuer system 110, and/or user device 112 (e.g., via communication network 114, via transaction processing network 101, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information from merchant system 102, payment gateway 104, acquirer system 106, issuer system 110, and/or user device 112, (e.g., via communication network 114, via transaction processing network 101, etc.) and/or communicating information to merchant system 102, payment gateway 104, acquirer system 106, issuer system 110, and/or user device 112 (e.g., via communication network 114, via transaction processing network 101, etc.). For example, transaction service provider system 108 may include a computing device, such as a server (e.g., a transaction processing server), a group of servers, and/or other like devices. In some non-limiting embodiments or aspects, transaction service provider system 108 may be associated with a transaction service provider as described herein.

Issuer system 110 may include one or more devices capable of receiving information from merchant system 102, payment gateway 104, acquirer system 106, transaction service provider system 108, and/or user device 112 (e.g., via communication network 114, via transaction processing network 101, etc.) and/or communicating information to merchant system 102, payment gateway 104, acquirer system 106, transaction service provider system 108, and/or user device 112 (e.g., via communication network 114, via transaction processing network 101, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

User device 112 may include one or more devices capable of receiving information from merchant system 102, payment gateway 104, acquirer system 106, transaction service provider system 108, and/or issuer system 110 (e.g., via communication network 114, via transaction processing network 101, etc.) and/or communicating information to merchant system 102, payment gateway 104, acquirer system 106, transaction service provider system 108, and/or issuer system 110 (e.g., via communication network 114, via transaction processing network 101, etc.). For example, user device 112 may include a client device and/or the like. In some non-limiting embodiments or aspects, user device 112 may be capable of receiving information (e.g., from merchant system 102) via a short range wireless communication connection (e.g., an NFC communication connection, an RFID communication connection, a Bluetooth® communication connection, and/or the like), and/or communicating information (e.g., to merchant system 102) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 are provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices or systems of environment 100.

Figure 2:
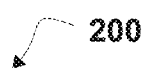
FIG. 2 is a diagram of non-limiting embodiments or aspects of components of one or more devices and/or one or more systems of FIG. 1.
Figure 2:
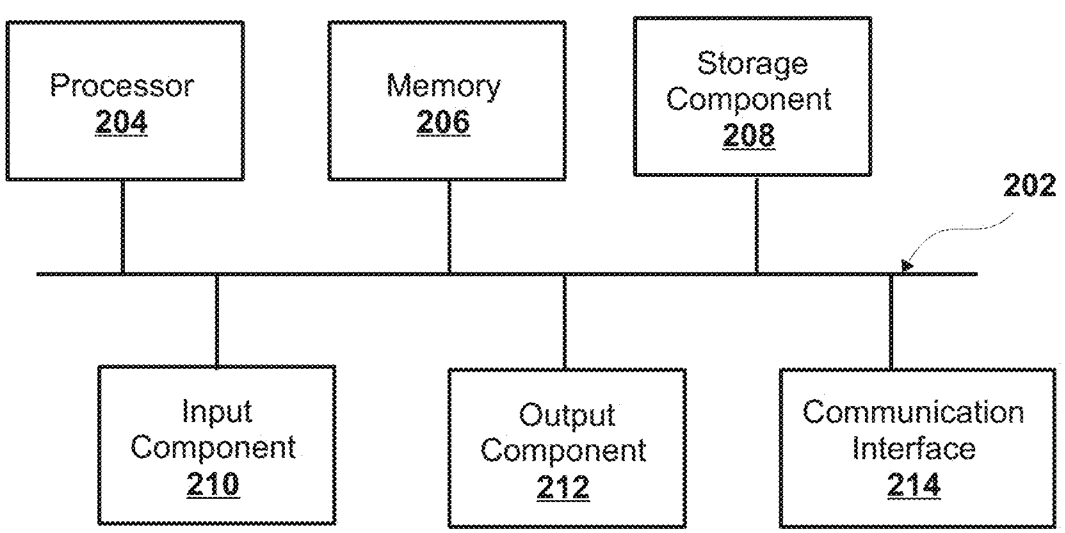
Figure 4:
FIG. 4 is a diagram of an implementation of non-limiting embodiments or aspects of a neural network.
Figure 4:
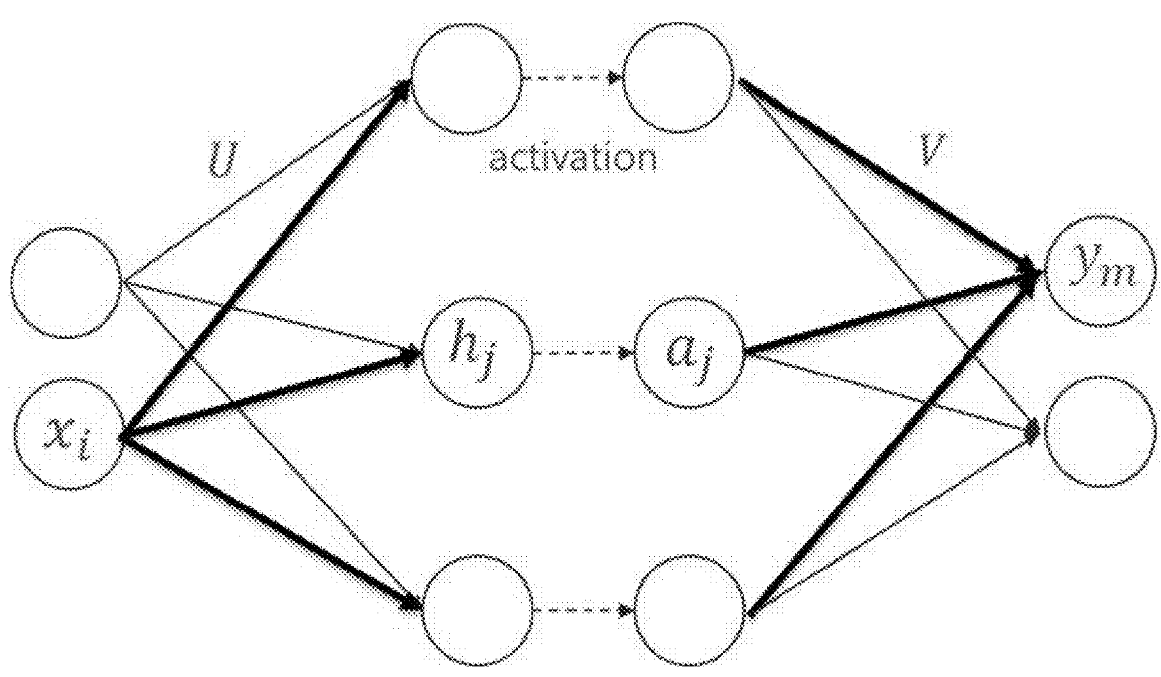

Referring now to FIG. 2, FIG. 2 is a diagram of example components of a device 200. Device 200 may correspond to one or more devices of transaction processing network 101, one or more devices of merchant system 102, one or more devices of payment gateway 104, one or more devices of acquirer system 106, one or more devices of transaction service provider system 108, one or more devices of issuer system 110, and/or user device 112. In some non-limiting embodiments or aspects, one or more devices of transaction processing network 101, one or more devices of merchant system 102, one or more devices of payment gateway 104, one or more devices of acquirer system 106, one or more devices of transaction service provider system 108, one or more devices of issuer system 110, and/or user device 112 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, an electroencephalogram (EEG) monitor, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, the information may include training data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
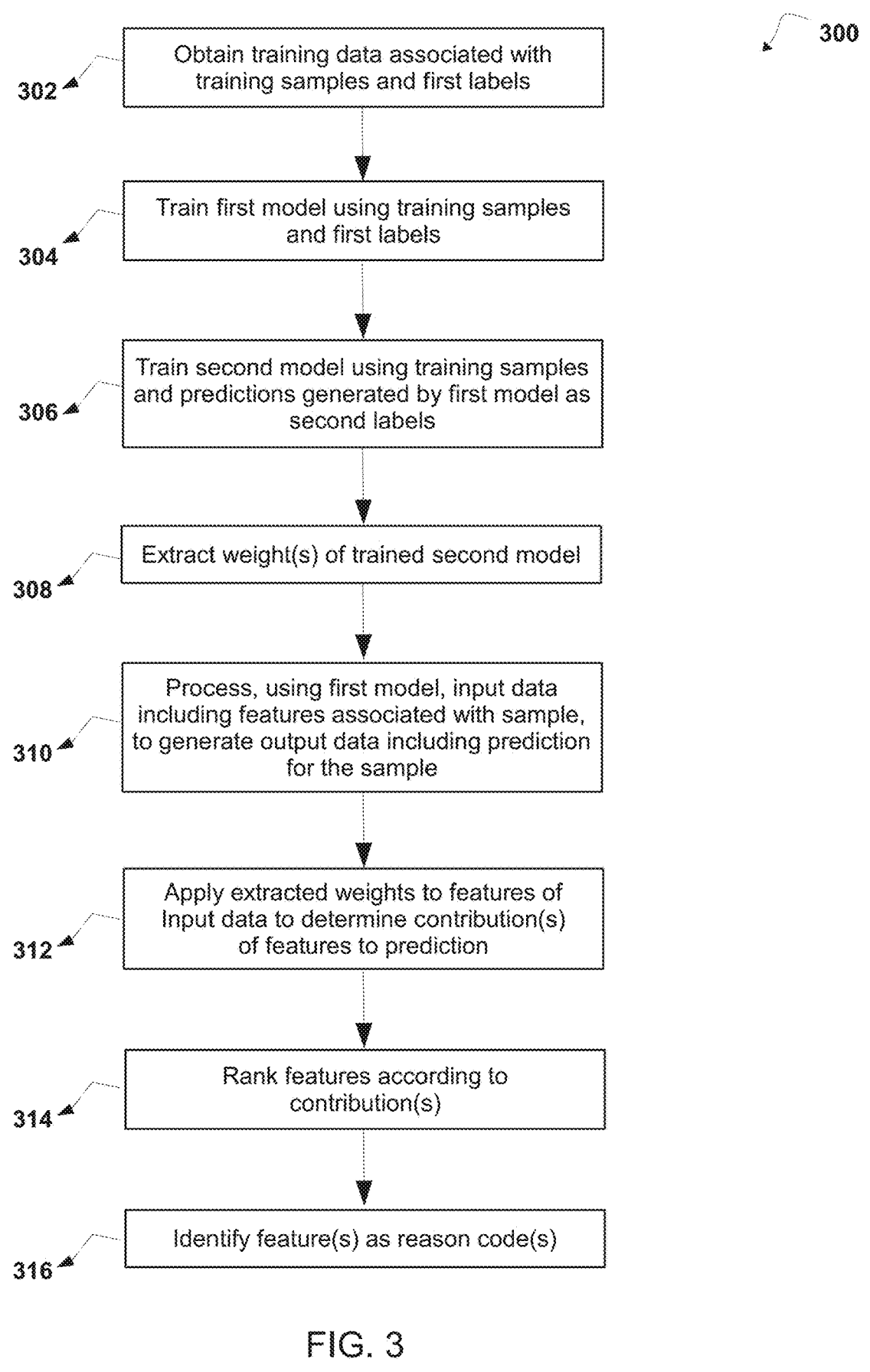

Referring now to FIG. 3, FIG. 3 is a flowchart of non-limiting embodiments or aspects of a process 300 for determining a reason for a deep learning model output. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102, etc.), payment gateway 104 (e.g., one or more devices of payment gateway 104, etc.), acquirer system 106 (e.g., one or more devices of acquirer system 106, etc.), issuer system 110 (e.g., one or more devices of issuer system 110, etc.), and/or user device 112.

As shown in FIG. 3, at step 302, process 300 includes obtaining training data associated with a plurality of training samples and a plurality of first labels for the plurality of training samples. For example, transaction service provider system 108 may obtain training data associated with a plurality of training samples and a plurality of first labels for the plurality of training samples.

In some non-limiting embodiments or aspects, training data includes transaction data. For example, a training sample may be associated with and/or correspond to a transaction (e.g., a prior transaction, a previously processed transaction, etc.) and/or include transaction data associated with the transaction (e.g., transaction parameters associated with the transaction, etc.), and a first label associated with the training sample may include an indication of whether the transaction is a fraudulent transaction (e.g., a true or fraud label, a false or non-fraud label, etc.). As an example, transaction data may include a classification label associated with a transaction (e.g., a prior transaction, a previously processed transaction, etc.), such as a true classification label (e.g., a label that indicates that the transaction is associated with fraud, a label that indicates that the transaction is not associated with fraud, labels for sets of positive and negative training examples or samples, etc.). However, non-limiting embodiments or aspects are not limited thereto, and training data may include any data including any type of parameters associated with a training sample, and a first label associated with the training sample may include any type of classification label and/or number of classification labels.

In some non-limiting embodiments or aspects, transaction data includes transaction parameters associated with transactions, such as payment transactions initiated and/or conducted with an electronic wallet application, and/or the like. Non-limiting examples of transaction parameters include: electronic wallet card data, decision data, authorization data, account identifier (e.g., PAN, etc.), transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like. In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

As shown in FIG. 3, at step 304, process 300 includes training a first model using the plurality of training samples and the plurality of first labels for the plurality of training samples. For example, transaction service provider system 108 may train a first model using the plurality of training samples and the plurality of first labels for the plurality of training samples. In some non-limiting embodiments or aspects, training the first model generates a plurality of predictions (e.g., a plurality of first predictions, etc.) for the plurality of training samples. For example, transaction service provider system 108 may provide, as input, a training sample to the first model, receive, as output, a first prediction for the training sample, and modify one or more parameters and/or weights of the first model according to an objective function that depends on a first label for the training sample and the first prediction for the training sample.

In some non-limiting embodiments or aspects, a prediction for a training sample includes a prediction of whether a transaction associated with and/or corresponding to the training sample is a fraudulent transaction (e.g., a true or fraud prediction, a false or non-fraud prediction, a probability associated with the transaction being fraudulent, etc.). However, non-limiting embodiments or aspects are not limited thereto, and a prediction for a training sample may include any type of prediction associated with a training sample.

As shown in FIG. 3, at step 306, process 300 includes training a second model using the plurality of training samples and the plurality of predictions as a plurality of second labels for the plurality of training samples. For example, transaction service provider system 108 may train a second model using the plurality of training samples and the plurality of predictions as a plurality of second labels for the plurality of training samples. As an example, transaction service provider system 108 may provide, as input, a training sample to the first model, receive, as output, a second prediction for the training sample, and modify one or more parameters and/or weights of the second model according to an objective function that depends on the first prediction for the training sample (e.g., as a second label for the training sample, etc.) and the second prediction for the training sample.

In some non-limiting embodiments or aspects, the first model includes a greater number of hidden layers than the second model. For example, the first model may include a more complex deep learning model (e.g., a deep neural network (DNN), a convolutional neural network (CNN), a recurrent neural network (RNN), a three or more layer neural network, etc.), and the second model may include a simpler neural network model (e.g., a two layer neural network, etc.). As an example, the second model may include an approximation of the first model.

As shown in FIG. 3, at step 308, process 300 includes extracting one or more weights of the trained second model. For example, transaction service provider system 108 may extract one or more weights of the trained second model. As an example, transaction service provider system 108 may store the one or more extracted weights (e.g., in memory, in a database, in an in-memory database (IMDB), etc.). In such an example, connections or paths between units or neurons in different layers of a trained neural network may be associated with weight values, and the weight values may be extracted from the neural network to determine contributions of features as described in more detail herein below with respect to FIGS. 4-7.

As shown in FIG. 3, at step 310, process 300 includes processing, using the first model, input data including a plurality of features associated with at least one sample, to generate output data. For example, transaction service provider system 108 may process, using the first model, input data including a plurality of features associated with at least one sample, to generate output data. In some non-limiting embodiments or aspects, the output data includes at least one prediction for the at least one sample. For example, transaction service provider system 108 may provide, as input, features associated with a sample (e.g., a non-training sample, etc.) to the first model, and receive, as output, a prediction for the sample.

In some non-limiting embodiments or aspects, a feature is associated with and/or corresponds to a transaction parameter. As an example, and referring also to FIGS. 4-7, a feature may include the transaction parameter of an AA_score, a feature may include the transaction parameter of a transaction amount, and/or the like. However, non-limiting embodiments or aspects are not limited thereto, and a feature may include any transaction parameter (and/or any other parameter), and the input data may include any number of transaction parameters (and/or other parameters) as feature data. In some non-limiting embodiments or aspects, a feature is normalized before the feature is input to the first model.

In some non-limiting embodiments or aspects, input data includes transaction data. For example, the at least one sample processed using the first model may correspond to a transaction (e.g., a new transaction, a current transaction, a transaction currently being processed in transaction processing network 101, etc.) and/or include transaction data associated with the transaction (e.g., transaction parameters associated with the transaction, etc.). As an example, the at least one prediction included in the output data generated by the first model may include at least one probability of whether the at least one transaction is a fraudulent transaction. However, non-limiting embodiments or aspects are not limited thereto, and input data may include any data including any type of parameters associated with a sample, and a prediction for the sample may include any type of prediction for the sample.

As shown in FIG. 3, at step 312, process 300 includes applying the one or more extracted weights to the plurality of features to determine one or more contributions of one or more features of the plurality of features to the at least one prediction for the at least one sample. For example, transaction service provider system 108 may apply the one or more extracted weights to the plurality of features to determine one or more contributions of one or more features of the plurality of features to the at least one prediction for the at least one sample. As an example, transaction service provider system 108 may evaluate the sample using the second model and identify the contribution score of each feature of the sample according to simple, real-time calculations from feature values and the extracted model weights.

In some non-limiting embodiments or aspects, the one or more contributions are determined in real-time during processing of at least one transaction in transaction processing network 101. For example, transaction service provider system 108 may receive transaction data associated with a current transaction in transaction processing network 101 and apply the one or more extracted weights to features of the transaction data to determine contributions of the features to a prediction (e.g., a first prediction, a prediction by the first model, etc.) of whether the transaction is fraudulent. As an example, steps 302-310 of process 300 may be performed offline (e.g., before receipt and/or initiation of a new or current transaction in transaction processing network 101, etc.), and steps 312-316 may be performed online (e.g., in real-time response to receiving, initiating, and/or conducting a transaction in transaction processing network 101, etc.).

In some non-limiting embodiments or aspects, the one or more extracted weights include a plurality of extracted weights, the plurality of extracted weights is associated with a plurality of hidden units of at least one hidden layer of the trained second model (e.g., a trained neural network, etc.), and the one or more contributions of the one or more features of the plurality of features to the at least one prediction for the at least one sample is determined by: calculating a score for each path of a plurality of paths of the one or more features through the second model based on the plurality of extracted weights and at least one activation function, and summing each score for each path of the plurality of paths to determine a contribution score for the one or more contributions of the one or more features. For example, and referring also to FIG. 4, in an implementation 400 of a trained neural network model according to non-limiting embodiments or aspects, transaction service provider system 108 may determine a contribution score for each contribution of the one or more contributions of the one or more features of the plurality of features to the at least one prediction for the at least one sample according to the following Equations (1) to (4):

$$h_j = \sum_{i=1}^{K} x_i * u_{ij} \tag{1}$$

$$a_j = \max(0, h_j) \tag{2}$$

$$y_m = \sum_{j=1}^{H} a_j * v_{jm} \tag{3}$$

$$\text{Contribution}(x_i -> y_m) = \sum_{j=1}^{H} (x_i * u_{ij}) * (a_j * v_{jm}) \tag{4}$$

wherein Contribution ($x_i \rightarrow y_m$) is the contribution score of a feature $x_i$ to a prediction $y_m$, wherein K is a number of the plurality of features, wherein H is a number of hidden units in a hidden layer of the trained second model, wherein M is a number of output units of an output layer of the trained second model, wherein U and V are weight matrices, wherein a number of weight matrices U is equal to K×H, wherein a number of weight matrices V is equal to H×M, wherein $u_{ij}$ is a weight matrix applied to the feature $x_i$ on a path to a hidden unit $h_j$, wherein $a_j$ is an activation unit of an activation layer between the hidden layer and the output layer of the trained second model, and wherein $v_{jm}$ is a weight matrix applied to an output of the activation unit $a_j$ on a path to the prediction $y_m$.

Figure 5:
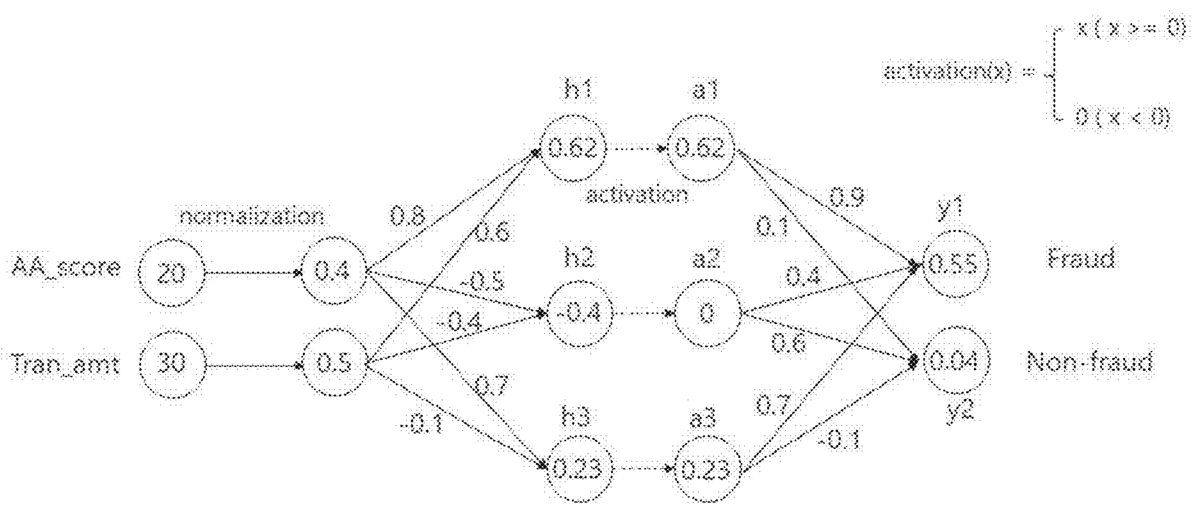
FIG. 5 is a diagram of an implementation of non-limiting embodiments or aspects of a neural network.
Figure 6:
FIG. 6 is a diagram of an implementation of non-limiting embodiments or aspects of a neural network.
Figure 6:
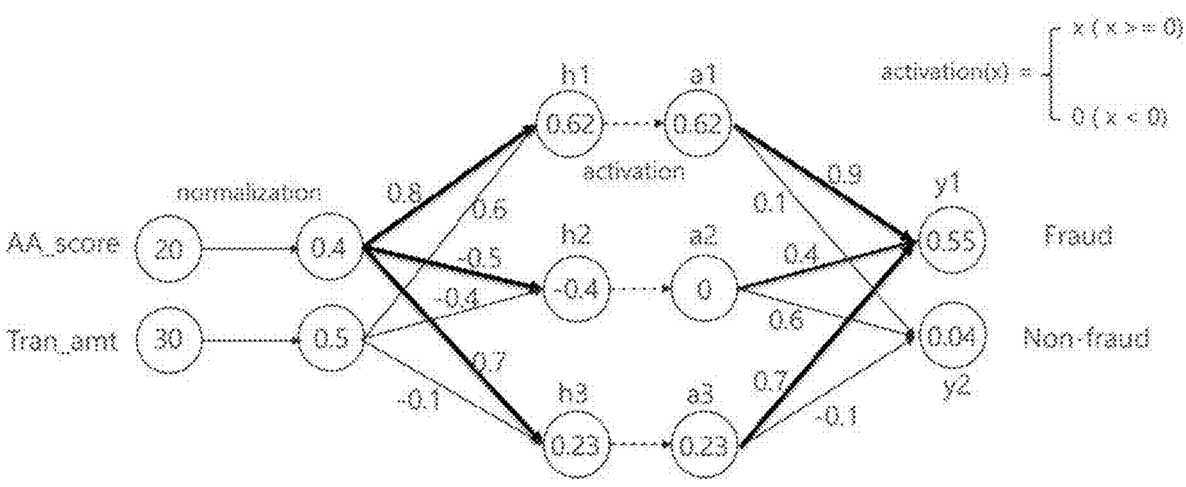
Figure 7:
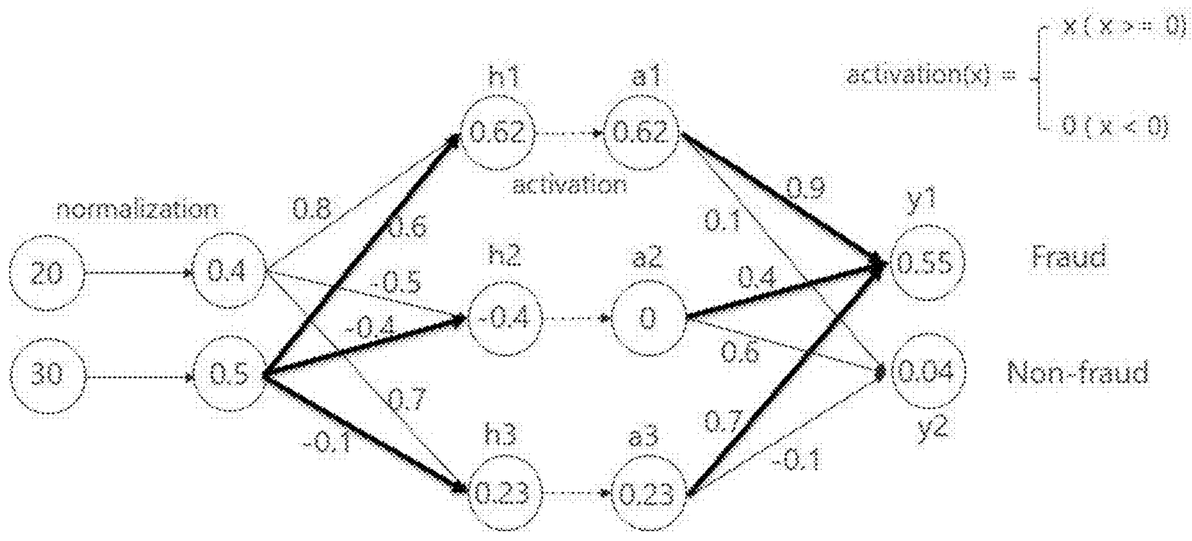
FIG. 7 is a diagram of an implementation of non-limiting embodiments or aspects of a neural network.

FIGS. 5-7 are diagrams of implementations 500, 600, and 700 of non-limiting embodiments or aspects of a neural network. For example, FIG. 5 shows an example for calculating a contribution of a feature AA_score and a feature tran_amt from extracted weights of a trained 2-layer neural network. As an example, features input to the trained neural network may be normalized. In such an example, after normalization, a feature AA_score of a value 20 may be normalized to 0.4 and a feature tran_amt of a value 30 may be normalized to 0.5. FIGS. 5-7 show a neural network including a single hidden layer including three neurons or hidden units h1, h2, and h3, a single activation function activation(x), and an output layer including output units y1 and y2; however, non-limiting embodiments or aspects are not limited thereto, and a neural network (e.g., a second model, an approximation of a deep neural network, etc.) may include any number of hidden layers, any number of hidden units in the hidden layers, any type of activation functions, and/or any number of output units as an approximation of the first model or a deep neural network. As shown in FIGS. 5-7, weights of the neural network, which are shown between the neurons or nodes thereof, may be used to determine values of the neurons or units thereof. For example, a value for the neuron or hidden unit h1 may be calculated as h1=0.4*0.8+0.5*0.6=0.62, and the activation function, which determines whether the neuron or hidden unit makes a contribution to the output may be defined as equal to x if (x>=0) and as equal to 0 if (x<0), which results in a1=h1=0.62. A value for the neuron or hidden unit h2 may be calculated as h2=0.4*(−0.5)+0.5*(−0.4)=−0.4, and the activation function, which determines whether the neuron or hidden unit makes a contribution to the output may be defined as equal to x if (x>=0) and as equal to 0 if (x<0), which results in a2=0 (h2<0). A value for the neuron or hidden unit h3 may be calculated as h3=0.4*0.7+0.5*(−0.1)

=0.23, and the activation function, which determines whether the neuron or hidden unit makes a contribution to the output may be defined as equal to x if (x>=0) and as equal to 0 if (x<0), which results in a3=h3=0.23. A value for the neuron or output unit y1 may be calculated as y1=0.62*0.9+0*0.4+0.23*0.7=0.55. For example, y1 may indicate a 55% probability of a transaction associated with the example input features of FIG. 5 being a fraudulent transaction. A value for the neuron or output unit y2 may be calculated as y2=0.62*0.1+0*0.6+0.23*(−0.1)=0.04. For example, y2 may indicate a 4% probability of the transaction associated with the example input features of FIG. 5 being a non-fraudulent transaction.

FIG. 6 shows an implementation 600 in which paths through the neural network for the feature AA_score are bolded and enlarged compared to other paths through the neural network. As shown in FIG. 6, a contribution of the feature AA_score to the output y1 may be determined by considering only the weights associated with the path of that feature through the neural network (e.g., Contribution (AA, path_x)=Contribution (input→hidden)*Contribution (hidden→output)). For example, (Contribution (AA, path_1)=(0.4*0.8)*(0.62*0.9)=0.878, Contribution (AA, path_2)=(0.4*-0.5)*(0*0.4)=0, and Contribution (AA, path_3)=(0.4*0.7)*(0.23*0.7)=0.441, which results in Contribution_score (AA)=0.878+0+0.441=1.319. For example, a score for each path of a feature through the neural network to an output unit is calculated, and each score for each path is added together to determine the contribution of that feature. As an example, a value at the input unit (e.g., after normalization) is multiplied by the extracted weight between that input unit and the hidden unit (e.g., h1, h2, or h3) on the path, the activation function is applied to the value at the hidden unit, and the value at the hidden unit after application of the activation function is multiplied by the extracted weight between that hidden unit and the output unit (e.g., y1).

FIG. 7 shows an implementation 700 in which paths through the neural network for the feature tran_amt are bolded and enlarged compared to other paths through the neural network. As shown in FIG. 7, a contribution of the feature tran_amt to the output y1 may be determined by considering only the weights associated with the path of that feature through the neural network (e.g., Contribution (Amt, path_x)=Contribution (input→hidden)*Contribution (hidden→output)). For example, Contribution (Amt, path_1)=(0.5*0.6)*(0.62*0.9)=0.167, Contribution (Amt, path_2)=(0.5*-0.4)*(0*0.4)=0, and Contribution (Amt, path_3)=(0.5*-0.1)*(0.23*0.7)=−0.008, which results in Contribution_score (Amt)=0.167+0-0.008=0.159. For example, a score for each path of a feature through the neural network to an output unit is calculated, and each score for each path is added together to determine the contribution of that feature. As an example, a value at the input unit (e.g., after normalization) is multiplied by the extracted weight between that input unit and the hidden unit (e.g., h1, h2, or h3) on the path, the activation function is applied to the value at the hidden unit, and the value at the hidden unit after application of the activation function is multiplied by the extracted weight between that hidden unit and the output unit (e.g., y1). In such an example, the Contribution_score (AA)=1.319 and the Contribution_score (Amt)=0.159 may indicate that the feature AA_score contributes significantly more to the output y1 and, thus, the prediction of the first model associated with the sample including this feature, than the feature tran_amt also included in that sample.

As shown in FIG. 3, at step 314, process 300 includes ranking the plurality of features associated with the at least one sample according to the one or more contributions of the one or more features of the plurality of features to the at least one prediction for the at least one sample. For example, transaction service provider system 108 may rank the plurality of features associated with the at least one sample according to the one or more contributions of the one or more features of the plurality of features to the at least one prediction for the at least one sample. As an example, and referring again to FIGS. 5-7, transaction service provider system 108 may rank the feature AA_score as having a more significant impact than the feature tran_amt on the prediction of the first model associated with the sample including these features.

As shown in FIG. 3, at step 316, process 300 includes identifying at least one feature of the plurality of features with respect to at least one other feature of the plurality of features based on the ranked plurality of features as at least one reason code associated with the at least one prediction. For example, transaction service provider system 108 may identify at least one feature of the plurality of features with respect to at least one other feature of the plurality of features based on the ranked plurality of features as at least one reason code associated with the at least one prediction. As an example, model outputs or scores may be obtained from the first model (e.g., a deep learning model, etc.) and reason codes for the model outputs or scores may be obtained from the ranked features. In such an example, and referring again to FIGS. 5-7, transaction service provider system 108 may identify the feature AA_score as a reason code associated with a prediction for the sample including the features AA_score and tran_amt.

In some non-limiting embodiments or aspects, a reason code provides an indication (e.g., a numerical value, an amount, a percentage, a statistical impact, etc.) of a contribution of a feature to a prediction for a particular sample including that feature. For example, feature importance may provide an indication of a contribution of a feature at a model level, and a reason code may provide an indication of a contribution of a feature at a sample level (e.g., for a particular sample, which features contribute the most for the prediction of that sample made by the model, etc.).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects; but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:

obtaining, with at least one processor, training data associated with a plurality of training samples and a plurality of first labels for the plurality of training samples;

training, with the at least one processor, a first neural network by:

providing, as input to the first neural network, the plurality of training samples, receiving, as output from the first neural network, a plurality of first predictions for the plurality of training samples, wherein the plurality of first predictions includes a plurality of first probabilities that a plurality of transactions associated with the plurality of training samples are fraudulent transactions, and modifying one or more first weights of the first neural network according to a first objective function that depends on the plurality of first labels and the plurality of first predictions to generate a first trained neural network;

training, with the at least one processor, a second neural network that has fewer hidden layers than the first neural network by:

providing as input to the second neural network, the plurality of training samples, receiving, as output from the second neural network, a plurality of second predictions for the plurality of training samples, wherein the plurality of second predictions includes a plurality of second probabilities that the plurality of transactions associated with the plurality of training samples are fraudulent transactions, and modifying one or more second weights associated with hidden units of at least one hidden layer of the second neural network according to a second objective function that depends on the plurality of first predictions as a plurality of second labels for the plurality of training samples and the plurality of second predictions to generate a second trained neural network;

extracting, with the at least one processor, from the second trained neural network, the one or more modified second weights associated with the hidden units of the at least one hidden layer of the trained second neural network;

obtaining, with the at least one processor, transaction data including a plurality of features $x_i$ associated with a transaction currently being processed in a transaction processing network;

processing, with the at least one processor, using the trained first neural network, the transaction data including the plurality of features $x_i$ associated with the transaction to generate a prediction for the transaction;

applying, by the at least one processor, in real-time during processing of the at least one transaction in the transaction processing network, the one or more modified second weights extracted from the trained second neural network to the plurality of features $x_i$ to generate a contribution score for each feature $x_i$ of the plurality of features $x_i$ to the prediction for the transaction generated by the first neural network by calculating a score for each path of a plurality of paths of each feature $x_i$ through the trained second neural network based on the one or more modified second weights extracted from the trained second neural network and at least one activation function, and summing each score for each path of the plurality of paths to determine the contribution score for that feature $x_i$, and providing, with the at least one processor, to a user device, in real-time during processing of the at least one transaction in the transaction processing network, the prediction and the contribution score for each feature $x_i$ as an indication of a contribution of that feature $x_i$ to the prediction.

2. The computer-implemented method of claim 1, wherein the first neural network includes a deep learning model including a greater number of hidden layers than the second neural network.

3. The computer-implemented method of claim 1, further comprising:

storing, with the at least one processor, in a memory, the one or more modified second weights removed from the trained second neural network.

4. The computer-implemented method of claim 1, wherein processing, using the trained first neural network, the transaction data including the plurality of features $x_i$ associated with the transaction includes:

providing, as input to the trained first neural network, the plurality of features $x_i$ associated with the transaction, receiving, as output from the trained first neural network, output data including the prediction for the transaction, wherein the prediction includes a probability that the transaction is a fraudulent transaction; and authorizing or denying, in the transaction processing network, based on the prediction including the probability that the transaction is a fraudulent transaction, the transaction.

5. The computer-implemented method of claim 4, wherein the one or more modified second weights include: weights for hidden units $h_j$ in a hidden layer of the trained second neural network, weights for activation units $a_j$ in an activation layer of the trained second neural network, weights for output units $y_m$ in an output layer of the trained second neural network, a weight matrix $u_{ij}$ applied to a feature $x_i$ on a path to a hidden unit $h_j$ of the trained second neural network, and a weight matrix $v_{jm}$ applied to an output of an activation unit $a_j$ on a path to an output unit $y_m$.

6. The computer-implemented method of claim 5, wherein the contribution score Contribution ($x_i \rightarrow y_m$) for each feature $x_i$ of the plurality of features $x_i$ to the prediction for the transaction received as output from the first neural network is determined according to the following Equations (1) to (4):

$$h_j = \sum_{i=1}^{K} x_i * u_{ij} \quad (1)$$

$$a_j = \max(0, h_j) \quad (2)$$

$$y_m = \sum_{j=1}^{H} a_j * v_{jm} \quad (3)$$

$$\text{Contribution}(x_i -> y_m) = \sum_{j=1}^{H} (x_i * u_{ij}) * (a_j * v_{jm}) \quad (4)$$

wherein Contribution ($x_i \rightarrow y_m$) is the contribution score of the feature $x_i$ to the output unit $y_m$, wherein K is a number of the plurality of features $x_i$, wherein His a number of the hidden units $h_j$ in the hidden layer removed from the trained second neural network, wherein M is a number of the output units $y_m$ of the output layer removed from the trained second neural network, wherein U and V are weight matrices, wherein a number of weight matrices U is equal to K×H, wherein a number of weight matrices V is equal to H×M, wherein $u_{ij}$ is the weight matrix applied to the feature $x_i$ on the path to the hidden unit $h_j$ removed from the trained second neural network, wherein $a_j$ is the activation unit of the activation layer between the hidden layer and the output layer removed from the trained second neural network, and wherein $v_{jm}$ is the weight matrix applied to the output of the activation unit $a_j$ on the path to the output unit $y_m$ removed from the trained second neural network.

7. A computing system comprising:

one or more processors programmed and/or configured to:

obtain training data associated with a plurality of training samples and a plurality of first labels for the plurality of training samples;

train a first neural network by:

providing, as input to the first neural network, the plurality of training samples, receiving, as output from the first neural network, a plurality of first predictions for the plurality of training samples, wherein the plurality of first predictions includes a plurality of first probabilities that a plurality of transactions associated with the plurality of training samples are fraudulent transactions, and modifying one or more first weights of the first neural network according to a first objective function that depends on the plurality of first labels and the plurality of first predictions to generate a first trained neural network;

train a second neural network that has fewer hidden layers than the first neural network by:

providing as input to the second neural network, the plurality of training samples, receiving, as output from the second neural network, a plurality of second predictions for the plurality of training samples, wherein the plurality of second predictions includes a plurality of second probabilities that the plurality of transactions associated with the plurality of training samples are fraudulent transactions, and modifying one or more second weights associated with hidden units of at least one hidden layer of the second neural network according to a second objective function that depends on the plurality of first predictions as a plurality of second labels for the plurality of training samples and the plurality of second predictions to generate a second trained neural network;

extract, from the second trained neural network, the one or more modified second weights associated with the hidden units of the at least one hidden layer of the trained second neural network;

obtain transaction data including a plurality of features $x_i$ associated with a transaction currently being processed in a transaction processing network;

process, using the trained first neural network, the transaction data including the plurality of features $x_i$ associated with the transaction to generate a prediction for the transaction;

apply in real-time during processing of the at least one transaction in the transaction processing network, using the one or more modified second weights extracted from the trained second neural network to the plurality of features $x_i$ to generate a contribution score for each feature $x_i$ of the plurality of features $x_i$ to the at least one prediction for the transaction generated by the first neural network by calculating a score for each path of a plurality of paths of each feature $x_i$ through the trained second neural network based on the one or more modified second weights extracted from the trained second neural network and at least one activation function, and summing each score for each path of the plurality of paths to determine the contribution score for that feature $x_i$, and provide, with the at least one processor, to a user device, in real-time during processing of the at least one transaction in the transaction processing network, the prediction and the contribution score for each feature $x_i$ as an indication of a contribution of that feature $x_i$ to the prediction.

8. The computing system of claim 7, wherein the first neural network includes a deep learning model including a greater number of hidden layers than the second neural network.

9. The computing system of claim 7, wherein the one or more processors are further programmed and/or configured to:

store, in a memory, the one or more modified second weights removed from the trained second neural network.

10. The computing system of claim 7, wherein the one or more processors process, using the trained first neural network, the transaction data including the plurality of features $x_i$ associated with the transaction by:

providing, as input to the trained first neural network, the plurality of features $x_i$ associated with the transaction, receiving, as output from the trained first neural network, output data including a prediction for the transaction, wherein the prediction includes a probability that the transaction is a fraudulent transaction; and authorizing or denying, in the transaction processing network, based on the prediction including the probability that the transaction is a fraudulent transaction, the transaction.

11. The computing system of claim 10, wherein the one or more modified second weights include: weights for hidden units $h_j$ in a hidden layer of the trained second neural network, weights for activation units $a_j$ in an activation layer of the trained second neural network, weights for output units $y_m$ in an output layer of the trained second neural network, a weight matrix $u_{ij}$ applied to a feature $x_i$ on a path to a hidden unit $h_j$ of the trained second neural network, and a weight matrix Vim applied to an output of an activation unit $a_j$ on a path to an output unit $y_m$.

12. The computing system of claim 11, wherein the contribution score for each feature $x_i$ of the plurality of features $x_i$ to the at least one prediction for the transaction received as output from the first neural network is determined according to the following Equations (1) to (4):

$$h_j = \sum_{i=1}^{K} x_i * u_{ij} \tag{1}$$

$$a_j = \max(0, h_j) \tag{2}$$

$$y_m = \sum_{j=1}^{H} a_j * v_{jm} \tag{3}$$

$$\text{Contribution}(x_i -> y_m) = \sum_{j=1}^{H} (x_i * u_{ij}) * (a_j * v_{jm}) \tag{4}$$

wherein Contribution ($x_i \rightarrow y_m$) is the contribution score of the feature $x_i$ to the output unit $y_m$, wherein K is a number of the plurality of features $x_i$, wherein His a number of the hidden units $h_j$ in the hidden layer removed from the trained second neural network, wherein M is a number of the output units $y_m$ of the output layer removed from the trained second neural network, wherein U and V are weight matrices, wherein a number of weight matrices U is equal to K×H, wherein a number of weight matrices V is equal to H×M, wherein $u_{ij}$ is the weight matrix applied to the feature $x_i$ on the path to the hidden unit $h_j$ removed from the trained second neural network, wherein $a_j$ is the activation unit of the activation layer between the hidden layer and the output layer removed from the trained second neural network, and wherein $v_{jm}$ is the weight matrix applied to the output of the activation unit $a_j$ on the path to the output unit $y_m$ removed from the trained second neural network.

13. A computer program product comprising at least one non-transitory computer-readable medium including program instructions that, when executed by at least one processor, cause the at least one processor to:

obtain training data associated with a plurality of training samples and a plurality of first labels for the plurality of training samples;

train a first neural network by:

providing, as input to the first neural network, the plurality of training samples, receiving, as output from the first neural network, a plurality of first predictions for the plurality of training samples, wherein the plurality of first predictions includes a plurality of first probabilities that a plurality of transactions associated with the plurality of training samples are fraudulent transactions, and modifying one or more first weights of the first neural network according to a first objective function that depends on the plurality of first labels and the plurality of first predictions to generate a first trained neural network;

train a second neural network that has fewer hidden layers than the first neural network by:

providing as input to the second neural network, the plurality of training samples, receiving, as output from the second neural network, a plurality of second predictions for the plurality of training samples, wherein the plurality of second predictions includes a plurality of second probabilities that the plurality of transactions associated with the plurality of training samples are fraudulent transactions, and modifying one or more second weights associated with hidden units of at least one hidden layer of the second neural network according to a second objective function that depends on the plurality of first predictions as a plurality of second labels for the plurality of training samples and the plurality of second predictions to generate a second trained neural network, extract, from the second trained neural network, the one or more modified second weights associated with the hidden units of the at least one hidden layer of the trained second neural network;

obtain transaction data including a plurality of features $x_i$ associated with a transaction currently being processed in a transaction processing network;

process, using the trained first neural network, the transaction data including the plurality of features $x_i$ associated with the transaction to generate a prediction for the transaction;

apply in real-time during processing of the at least one transaction in the transaction processing network, using the one or more modified second weights extracted from the trained second neural network to the plurality of features $x_i$ to generate a contribution score for each feature $x_i$ of the plurality of features $x_i$ to the at least one prediction for the transaction generated by the first neural network by calculating a score for each path of a plurality of paths of each feature $x_i$ through the trained second neural network based on the one or more modified second weights extracted from the trained second neural network and at least one activation function, and summing each score for each path of the plurality of paths to determine the contribution score for that feature $x_i$, and provide, with the at least one processor, to a user device, in real-time during processing of the at least one transaction in the transaction processing network, the prediction and the contribution score Contribution $(x_i \rightarrow y_m)$ for each feature $x_i$ as an indication of a contribution of that feature $x_i$ to the prediction.

14. The computer program product of claim 13, wherein the first neural network includes a deep learning model including a greater number of hidden layers than the second neural network.

15. The computer program product of claim 13, wherein the program instructions, when executed by at least one processor, further cause the at least one processor to:

store, in a memory, the one or more modified second weights removed from the trained second neural network.

16. The computer program product of claim 13, wherein the program instructions, when executed by at least one processor, further cause the at least one processor to process, using the trained first neural network, the transaction data including the plurality of features $x_i$ associated with the transaction by:

providing, as input to the trained first neural network, the plurality of features $x_i$ associated with the transaction, receiving, as output from the trained first neural network, output data including a prediction for the transaction, wherein the prediction includes a probability that the transaction is a fraudulent transaction; and authorizing or denying, in the transaction processing network, based on the prediction including the probability that the transaction is a fraudulent transaction, the transaction.

17. The computer program product of claim 16, wherein the one or more modified second weights include: weights for hidden units $h_j$ in a hidden layer of the trained second neural network, weights for activation units $a_j$ in an activation layer of the trained second neural network, weights for output units $y_m$ in an output layer of the trained second neural network, a weight matrix $u_{ij}$ applied to a feature $x_i$ on a path to a hidden unit $h_j$ of the trained second neural network, and a weight matrix Vim applied to an output of an activation unit $a_j$ on a path to an output unit $y_m$.

18. The computer program product of claim 17, wherein the contribution score Contribution $(x_i \rightarrow y_m)$ for each feature $x_i$ of the plurality of features $x_i$ to the prediction for the transaction received as output from the first neural network is determined according to the following Equations (1) to (4):

$$h_j = \sum_{i=1}^{K} x_i * u_{ij} \quad (1)$$

-continued $$a_j = \max(0, h_j) \quad (2)$$

$$y_m = \sum_{j=1}^{H} a_j * v_{jm} \quad (3)$$

$$\text{Contribution}(x_i -> y_m) = \sum_{j=1}^{H} (x_i * u_{ij}) * (a_j * v_{jm}) \quad (4)$$

wherein Contribution ($x_i \rightarrow y_m$) is the contribution score of the feature $x_i$ to the output unit $y_m$, wherein K is a number of the plurality of features $x_i$, wherein His a number of the hidden units $h_j$ in the hidden layer removed from the trained second neural network, wherein M is a number of the output units $y_m$ of the output layer removed from the trained second neural network, wherein U and V are weight matrices, wherein a number of weight matrices U is equal to K×H, wherein a number of weight matrices V is equal to H×M, wherein $u_{ij}$ is the weight matrix applied to the feature $x_i$ on the path to the hidden unit $h_j$ removed from the trained second neural network, wherein $a_j$ is the activation unit of the activation layer between the hidden layer and the output layer removed from the trained second neural network, and wherein $v_{jm}$ is the weight matrix applied to the output of the activation unit $a_j$ on the path to the output unit $y_m$ removed from the trained second neural network.

* * * * *